United States Patent [19]

Matsuno et al.

[11] 4,163,313
[45] Aug. 7, 1979

[54] TRANSFER MACHINE

[75] Inventors: Takeshi Matsuno; Fumiya Nishiyama; Takeshi Kobayashi, all of Narashino, Japan

[73] Assignee: Seiko Seiki Kabushiki Kaisha, Japan

[21] Appl. No.: 841,400

[22] Filed: Oct. 12, 1977

[30] Foreign Application Priority Data

Oct. 12, 1976 [JP] Japan.................... 51-122041

[51] Int. Cl.² ............... B23Q 7/00; B23B 3/00; B23C 1/16; B23G 1/20
[52] U.S. Cl. ................... 29/563; 29/33 R; 82/2 B; 408/3; 408/44; 409/80; 409/173
[58] Field of Search .............. 29/33 R, 564, 563, 565, 29/38 B, 38 R, 38 A, 38 C; 408/43, 44, 45, 46.3; 82/2 B; 90/13 C

[56] References Cited

U.S. PATENT DOCUMENTS

| | | | |
|---|---|---|---|
| 1,933,500 | 10/1933 | Spring | 29/38 A |
| 2,429,938 | 10/1947 | Mansfield | 29/38 C |
| 2,533,326 | 12/1950 | Putt | 90/13 C |
| 2,832,023 | 4/1958 | Gough | 82/2 B |
| 3,404,589 | 10/1968 | Brown et al. | 29/38 R |
| 3,448,642 | 6/1969 | Shultz | 29/38 C |
| 3,698,052 | 10/1972 | Ellis | 29/38 C |
| 3,742,791 | 7/1973 | Sato | 29/38 A |
| 3,891,910 | 6/1975 | Kumagai et al. | 90/13 C |
| 3,895,424 | 7/1975 | Hautau | 408/44 |
| 4,052,601 | 10/1977 | Corni | 29/563 |

*Primary Examiner*—Harrison L. Hinson
*Attorney, Agent, or Firm*—Robert E. Burns; Emmanuel J. Lobato; Bruce L. Adams

[57] ABSTRACT

A transfer machine composing of a rotary indexing table with a positioning device for transferring plural jig plates holding workpieces to be machined thereon and which are intermittently indexed and working units being arranged near the circumference of the indexing table. Every working unit having a cutting infeed device to make its cutter head step forward or backward in a working direction and multi-axes sliding devices for changing & adjusting the relative position between the cutter head and the jig plate, and these sliding devices being controlled by feed-volume setting devices corresponded with setting volumes selected therein and with the result that the said relative position being decided and set.

3 Claims, 5 Drawing Figures

TRANSFER MACHINE

BACKGROUND OF THE INVENTION

The present invention relates to a transfer machine composed of a transferring positioning table to position transferred workpieces and a plurality of working units, and it especially relates to the working units having sliding devices for positioning a tool and a numerical control system for driving it in every said working unit of said transfer machine.

Conventionally, in general transfer machine, changing & adjusting the relative positions between jig plates holding workpieces thereon and a working unit is carried out by replacing said jig plates or positioning base plates of said working units or operating position adjusting devices of the working units by hand. As mentioned above, the conventional operations of positional changes or adjustments are very troublesome, especially in the transfer machine having a large number of working units and performing frequently operations to change tool arrangements for other kind of working (hereafter this operation is called only "tooling change") is practically very difficult.

But, recently, by numerical controlling the cutting infeed driving system of every working unit, the so-called NC-transfer machine able to obtain an optical working locus will be developing and thereby will cope with the above tooling change by a simple program-change. However, the driving and controlling systems thereof will become very large and complicated due to controlling numerically the cutting infeed system of every working unit and plan high speed driving thereof.

SUMMARY OF THE INVENTION

In view of above mentioned matters, it is an object of this invention to provide a transfer machine provided with one or multi-axes sliding devices for positioning to make cutter heads of working units displaceable relative to bases and to numerically control the same independently from a cutting infeed system of every working unit (cam-feed device, cylinder-feed device or the like). By such a transfer-machine according to this invention, the position changes and adjustments of the working units at the time of performing a tooling change operation or the like can be very easily conducted, and these numerical control systems of the sliding devices for positioning are only operated at the time of tooling change and not operated at the time of normal cutting feed, therefore the composition of the systems can become very simple and small scale.

BRIEF DESCRIPTION OF DRAWINGS

The drawings show one of the embodiments of this invention, and therein

DETAILED DESCRIPTION OF THE PREFERRED EMBODIMENT

Figure 1:
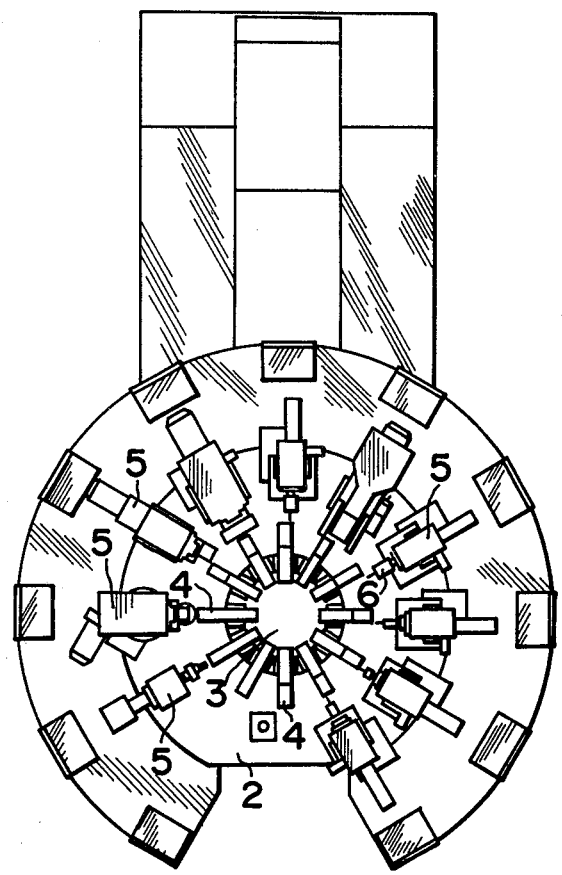
FIG. 1 shows an entire outlined plan of the transfer machine.
Figure 2:
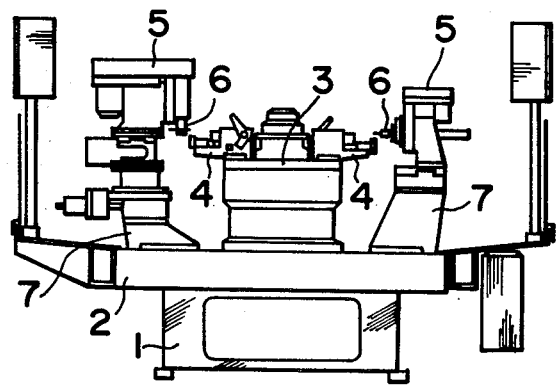
FIG. 2 shows a front view thereof.

FIG. 1 and FIG. 2 show outlined compositions of the transfer machine according to one preferred embodiment of this invention. Therein, "1" is a lower base, "2" is a nearly circular shaped stationary table fixed on said lower base "1" and "3" is a rotary type indexing table mounted on the center portion of said stationary table "2". On the circumferential portion of the indexing table "3" jig plates "4" are fixed and correspond with working stations, and said indexing table is dividedly rotated to according to the position of each working station and the be positioned opposite each of them by an index-driving device not shown in the figure.

Devices "5, 5, . . ." are working units to perform various working operations to the workpieces such as drilling, milling and the like operations and these units "5" are arranged to correspond with every working station fixed on the stationary table "2" near by the circumference of the indexing table "3". Every working unit "5" is operable for moving a cutter head "6" thereof in a working direction. That is, every working unit "5" has a cutting infeed device to impart a cutting-movement such as a cam-feed type or cylinder feed type, and further every working unit "5" has sliding devices for positioning to make the cutter head "6" displaceable in the necessary direction against the jig plate "4".

Then the cutting-in operation is performed for workpieces held on the jig plate "4" by the cutting infeed device of the each working unit "5" and thereby the desired working operation is completed, and, in addition, at the time of tooling change the change and adjustment of the relative position between the jig plate "4" and the cutter head "6" of the working unit "5" are performed by a numerically controlled Y-axis sliding device "8" and a Z-axis sliding device "11" for positioning.

Figure 3A:
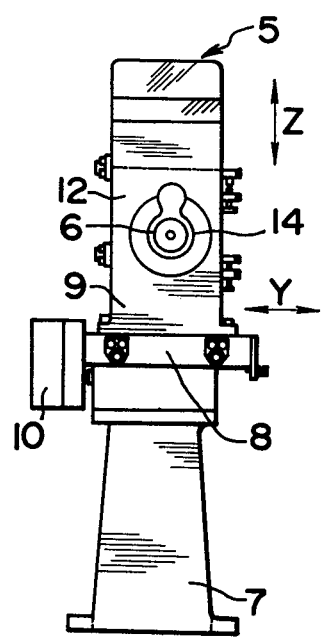
FIG. 3 (A) & (B) show respectively front and side views of one detailed example of the working unit.
Figure 3B:
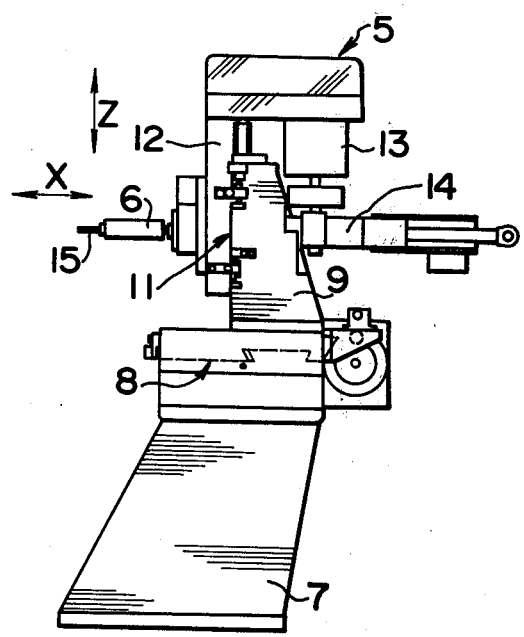

Next, one example of these working units "5" will be described in detail according to FIG. 3. This working unit "5" is a horizontal drilling unit and a unit base "7" thereof is fixed at a specified position of said stationary table "2". Reference numeral "8" shows a Y-axis sliding device and forces to slide optionally a slide frame "9" in the direction of the Y-axis against the jig plate "4", and this sliding device "8" is composed of a dovetailed guide way, a screw-feed mechanism to make the slide frame "9" slide, a pulse motor "10" to drive said screw-feed mechanism and is etc., and further provided with an origin detector to detect the origin of the slide frame "9" and a position detector composed of a mechanical counter to detect the displacement from the position of origin of the slide frame "9" and other features. And "11" shows a Z-axis sliding device and forces to slide optionally a slide table "12" in the direction of the Z-axis against the jig plate "4" and this Z-axis sliding device "11" is composed features as the same of the Y-axis sliding device "8" and also "13" is a pulse motor to drive this sliding device. Furthermore, "14" is an air-spindle device mounted on the slide table "12" and is placed in the direction of the X-axis which is perpendicular to the Y-axis and Z-axis so that the air-spindle can make the cutter head "6" step forward and backward along the X-axis direction and is driven to rotate by air pressure. That is, this air-spindle device "14" is built in the cutting-infeed mechanism in feed a drill "15" to the working direction.

Figure 4B:
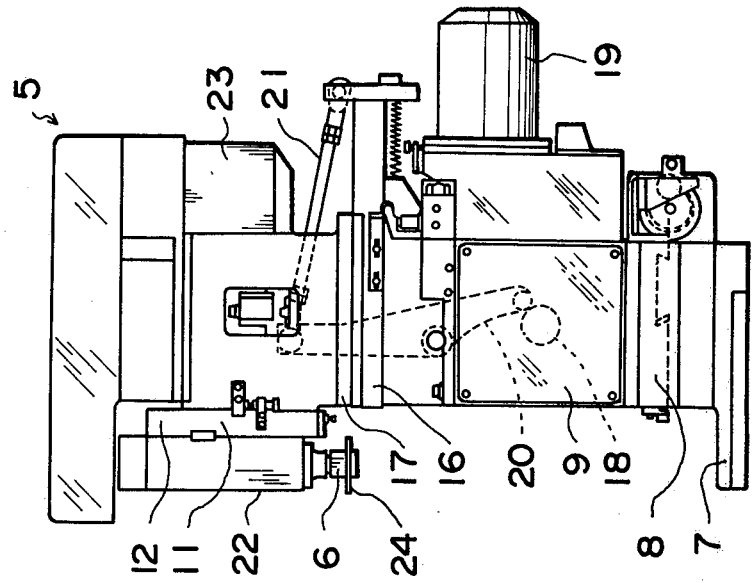
FIG. 4 (A) & (B) show respectively front and side views of other detailed example of the working unit and FIG. 5 is a block diagram of the control system of sliding devices for positioning.
Figure 4A:
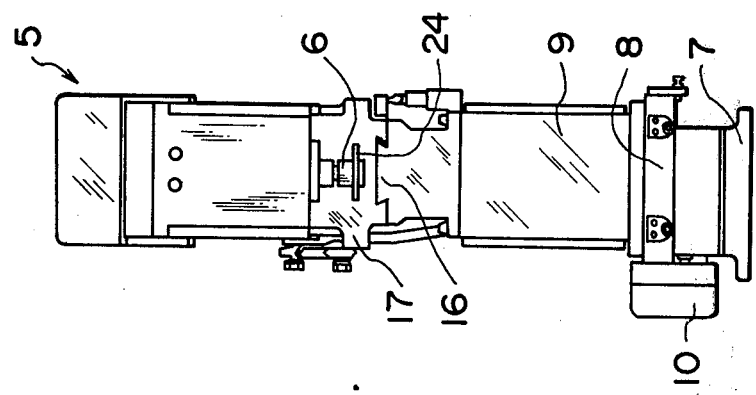

The other example of the working unit "5" will be described in the same manner according to FIG. 4. This working unit "5" is a vertical milling unit and wherein "7" is a unit base, "8" is a Y-axis sliding device to force to slide optionally a slide frame "9" in the direction of the Y-axis against the jig plate "4". Reference numeral "16" shows a cutting-infeed mechanism to make the cutting infeed plate "17" step forward and backward in the X-axis direction against the jig plate "4". This cutting infeed mechanism "16" is composed of a cam feeding type, wherein "18" is a cam to impart cutting infeed motion to the said cutting infeed plate "17" and "19" is a driving motor for cutting infeed to rotate said cam "18". The element "20" is a lever in contact with said cam "18" at one end thereof and "21" shows a link connected between the other end of said lever "20" and the cutting infeed plate "17" to impart infeed movement to the cutting infeed plate "17". And "11" shows a Z-axis sliding device to force to slide optionally a slide table "12" in the direction of the Z-axis against the jig plate "4" and "22" is a spindle device mounted on the sliding table "12" and "23" is a driving motor to rotate said spindle device "22". This spindle device "22" is arranged in the direction of the Z-axis and also a metal saw 24 is held at a lower end portion thereof and is rotated by motor "23" and further the infeed movement of said spindle device is fed in the direction of X-axis by the cutting infeed device "16".

Figure 5:
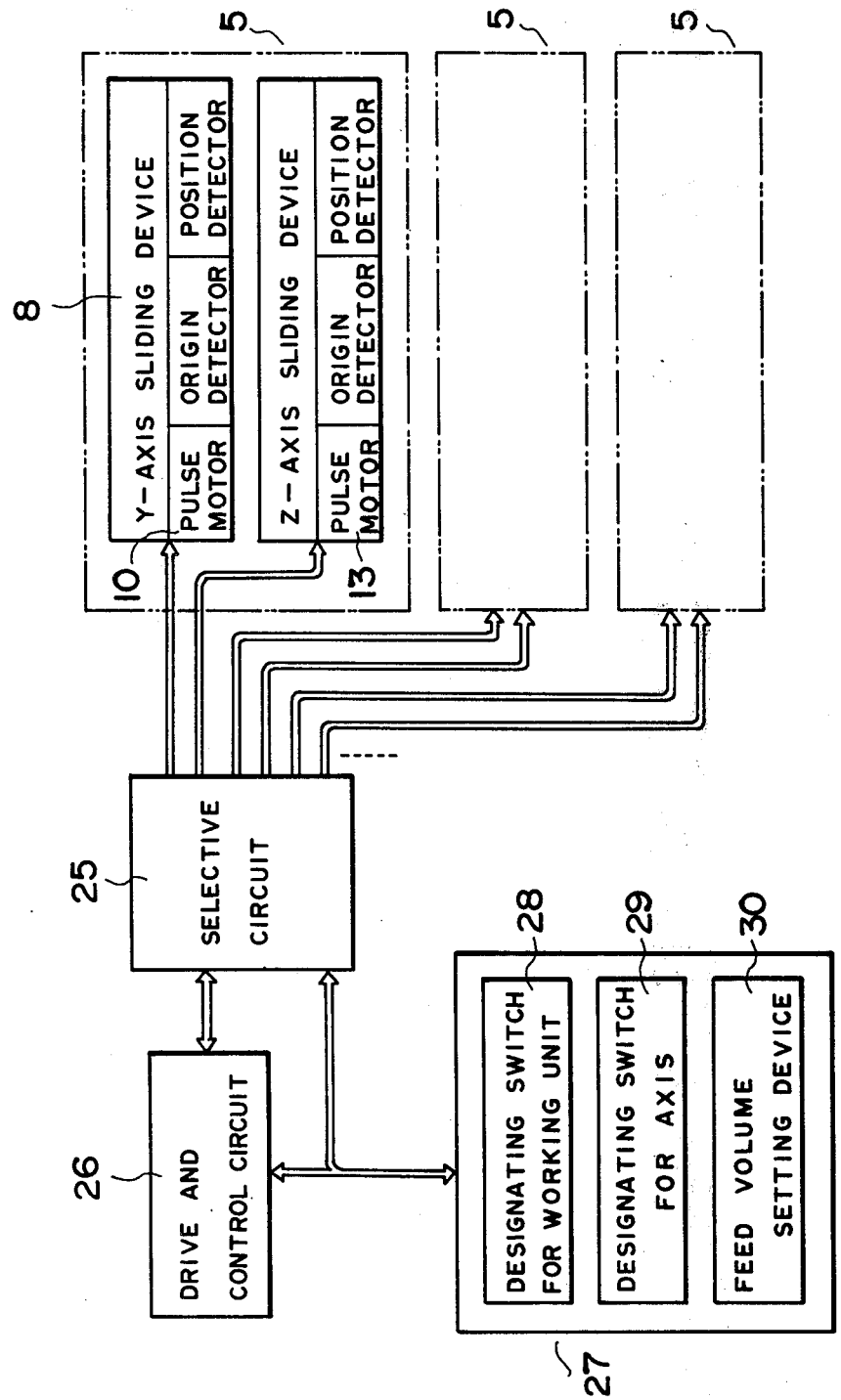

As described above on the two kinds of working units "5", every working unit "5" has a cutting infeed mechanism to make the cutter head "6" step forward and backward in the working direction for operating on a workpiece and is composed of cam feed type or cylinder feed type, and further has additionally multi axes sliding devices to change and adjust the relative position between the cutter head "6" (a cutter fixed therein) and the jig plate "4" (a workpiece held therein). The pulse motor "10" driving this sliding device is numerically controlled as follows:

FIG. 5 is a block diagram which shows the outlined drive and control system of every working unit "5". As shown in the figure, the sliding device of every axis of every working unit "5" is connected in a parallel to a selective circuit "25", therefore only one sliding device at a time which is selected by the selecting operation of said selective circuit "25" is connected to a drive and control circuit "26". That is, if the sliding device of a selected direction of the working unit, which is selected by the operation of a designating switch for working unit "28" and axis-designating switch "29" in the input device "27", is designated, the said designated sliding device is connected with the drive and control circuit "26" through the selective circuit "25". And then after the selected feeding volume (position) set in a setting device "30" composed of a digital switch and other features is applied to the decided sliding device "8", the pulse motor "10" rotates reversely in spite of the setting feed volume and is continuously driven and stopped until when it is detected that the said sliding device "8" returns to the origin.

After this, the pulse motor "10" is operated to forward rotated by only the number of pulse corresponding with the selected feed volume. Thus, with only a single input device "27" and drive & control circuit "26", every axis of the sliding device of every working unit "5" is successively controlled one by one and in this way all tooling changes of transfer machine can be completed. Of course, a clamping device is provided in every sliding device and it is unclamped before the operation of changing position and it is clamped again after positioning.

Moreover, the numerical control system of every sliding device is not limited to that of this embodiment shown in FIG. 5 and can be provided with respective drive and control circuits for every sliding device so that they are able to be operated simultaneously.

It is clear from the above descriptions that the transfer machine according to this invention provides the sliding devices for positioning on every working unit and provides the numerical control system, so that the position change and adjustment of every working unit can be precisely performed by a very easy procedure at the time of tooling change operation and etec. Furthermore, these devices and system are to be used only at the time of tooling change and need not to be used at the time of cutting feed, so that the moving speed thereof is allowed to be lower. Accordingly the driving devices can be composed in very small scale and simplified with the result that the fabrication cost becomes very low.

What is claimed is:

1. A transfer machine, comprising: a movable indexing table having a plurality of workpiece positions where respective workpieces are positioned in use; a plurality of working units each defining a working station positioned around said movable indexing table opposite a respective workpiece position; means for moving said indexing table to change the respective workpiece position which is opposite a particular working unit; wherein each of said working units comprises a tool, infeeding means for infeeding said tool toward a respective workpiece position for working on the workpiece and for withdrawing the tool from the workpiece, a slide for displacing said tool along a direction perpendicular to the infeed direction, a screw-feed mechanism for moving said tool along said slide, driving means for driving said screw-feed mechanism to move said tool along said slide, an origin detector for defining a position origin along said slide and for detecting when said tool is at said origin, a tool position detector for detecting the amount of displacement of said tool away from said origin; and a numerical control system comprising means operable for actuating said driving means for driving said screw-feed mechanism, setting circuit means cooperative with said origin and position detectors for setting the displacement of said tool along said slide from said origin, and selecting circuit means for successively selecting successive working units for successively actuating their respective driving means and for successively setting the displacement of their respective tools along their respective slides independently of the operation of said infeeding means.

2. A transfer machine according to claim 1, wherein said indexing table is circular and said working units are positioned around a periphery of said circular indexing table, and wherein a respective slide of each of said working units is tangential to the periphery of said circular indexing table.

3. A transfer machine according to claim 1, wherein said indexing table is circular and said working units are positioned around a periphery of said circular indexing table, and wherein a respective slide of each of said working units is perpendicular to said circular indexing table.

* * * * *